United States Patent
Mahurin et al.

(10) Patent No.: US 10,489,155 B2
(45) Date of Patent: Nov. 26, 2019

(54) MIXED-WIDTH SIMD OPERATIONS USING EVEN/ODD REGISTER PAIRS FOR WIDE DATA ELEMENTS

(71) Applicant: QUALCOMM Incorporated, San Diego, CA (US)

(72) Inventors: Eric Wayne Mahurin, Austin, TX (US); Ajay Anant Ingle, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 14/805,456

(22) Filed: Jul. 21, 2015

(65) Prior Publication Data

US 2017/0024209 A1  Jan. 26, 2017

(51) Int. Cl.
*G06F 15/80* (2006.01)
*G06F 9/302* (2018.01)
*G06F 9/315* (2018.01)
*G06F 9/30* (2018.01)
*G06F 9/38* (2018.01)

(52) U.S. Cl.
CPC ........ *G06F 9/30036* (2013.01); *G06F 9/3001* (2013.01); *G06F 9/30032* (2013.01); *G06F 9/30098* (2013.01); *G06F 9/30105* (2013.01); *G06F 9/30112* (2013.01); *G06F 9/3887* (2013.01); *G06F 15/8007* (2013.01); *G06F 15/8053* (2013.01)

(58) Field of Classification Search
CPC .............. G06F 9/30036; G06F 9/3001; G06F 9/300032; G06F 9/30098; G06F 9/30032; G06F 9/34; G06F 9/30105; G06F 9/30112; G06F 9/3887; G06F 15/8007; G06F 9/8053

USPC .................. 712/2–9, 22, 210, 221, 223, 225
See application file for complete search history.

(56) References Cited

U.S. PATENT DOCUMENTS

| | | |
|---|---|---|
| 6,202,141 B1 | 3/2001 | Diefendorff et al. |
| 6,922,716 B2 | 7/2005 | Desai et al. |

(Continued)

FOREIGN PATENT DOCUMENTS

EP    0751456 A1    1/1997

OTHER PUBLICATIONS

International Search Report and Written Opinion—PCT/US2016/038487—ISA/EPO—dated Aug. 11, 2016.

*Primary Examiner* — Daniel H Pan
(74) *Attorney, Agent, or Firm* — Muncy, Geissler, Olds & Lowe, P.C./Qualcomm (57) ABSTRACT

Systems and methods relate to a mixed-width single instruction multiple data (SIMD) instruction which has at least a source vector operand comprising data elements of a first bit-width and a destination vector operand comprising data elements of a second bit-width, wherein the second bit-width is either half of or twice the first bit-width. Correspondingly, one of the source or destination vector operands is expressed as a pair of registers, a first register and a second register. The other vector operand is expressed as a single register. Data elements of the first register correspond to even-numbered data elements of the other vector operand expressed as a single register, and data elements of the second register correspond to data elements of the other vector operand expressed as a single register.

12 Claims, 7 Drawing Sheets

(56) References Cited

U.S. PATENT DOCUMENTS

| | | |
|---|---|---|
| 7,107,305 B2 | 9/2006 | Deng et al. |
| 7,127,593 B2 * | 10/2006 | Wilson ................ G06F 9/30014 712/22 |
| 7,219,212 B1 | 5/2007 | Sanghavi et al. |
| 7,668,897 B2 | 2/2010 | Kershaw |
| 8,521,997 B2 | 8/2013 | Wilson |
| 2005/0125476 A1 * | 6/2005 | Symes ................ G06F 9/30014 708/524 |
| 2007/0033381 A1 * | 2/2007 | Wilson ................ G06F 9/30014 712/21 |
| 2014/0237218 A1 | 8/2014 | Gopal et al. |
| 2015/0154024 A1 | 6/2015 | Anderson et al. |

* cited by examiner

FIG. 1A
CONVENTIONAL

FIG. 1B
CONVENTIONAL

FIG. 1C
CONVENTIONAL

MIXED-WIDTH SIMD OPERATIONS USING EVEN/ODD REGISTER PAIRS FOR WIDE DATA ELEMENTS

FIELD OF DISCLOSURE

Aspects of this disclosure pertain to operations involving two or more vectors where data elements of at least one vector are of a different bit-width than data elements of at least one other vector. Such operations are referred to as mixed-width operations. More specifically, some aspects relate to mixed-width single instruction multiple data (SIMD) operations involving at least a first vector operand and a second vector operand where at least one of the first or second vector operands have data elements which may be stored in even or odd register pairs.

BACKGROUND

Single instruction multiple data (SIMD) instructions may be used in processing systems for exploiting data parallelism. Data parallelism exists when a same or common task needs to be performed on two or more data elements of a data vector, for example. Rather than use multiple instructions, the common task may be performed on the two or more data elements in parallel by using a single SIMD instruction which defines the same instruction to be performed on multiple data elements in corresponding multiple SIMD lanes.

SIMD instructions may include one or more vector operands such as source and destination vector operands. Each vector operand would include two or more data elements. For SIMD instructions, all data elements belonging to the same vector operand may generally be of the same bit-width. However, some SIMD instructions may specify mixed-width operands where data elements of a first vector operand may be of a first bit-width and data elements of a second vector operand may be of a second bit-width, where the first and second bit-widths differ from each other. Execution of SIMD instructions with mixed-width operands may involve several challenges.

Figure 1A:
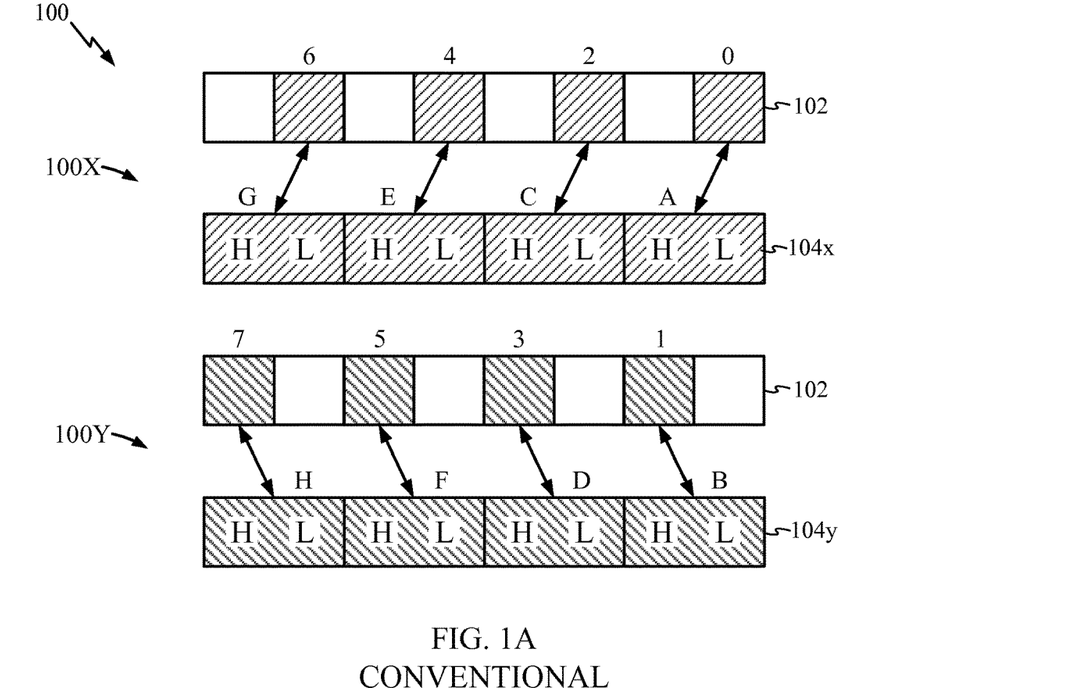
FIGS. 1A-C illustrate conventional implementations of mixed-width SIMD instructions.
Figure 1B:
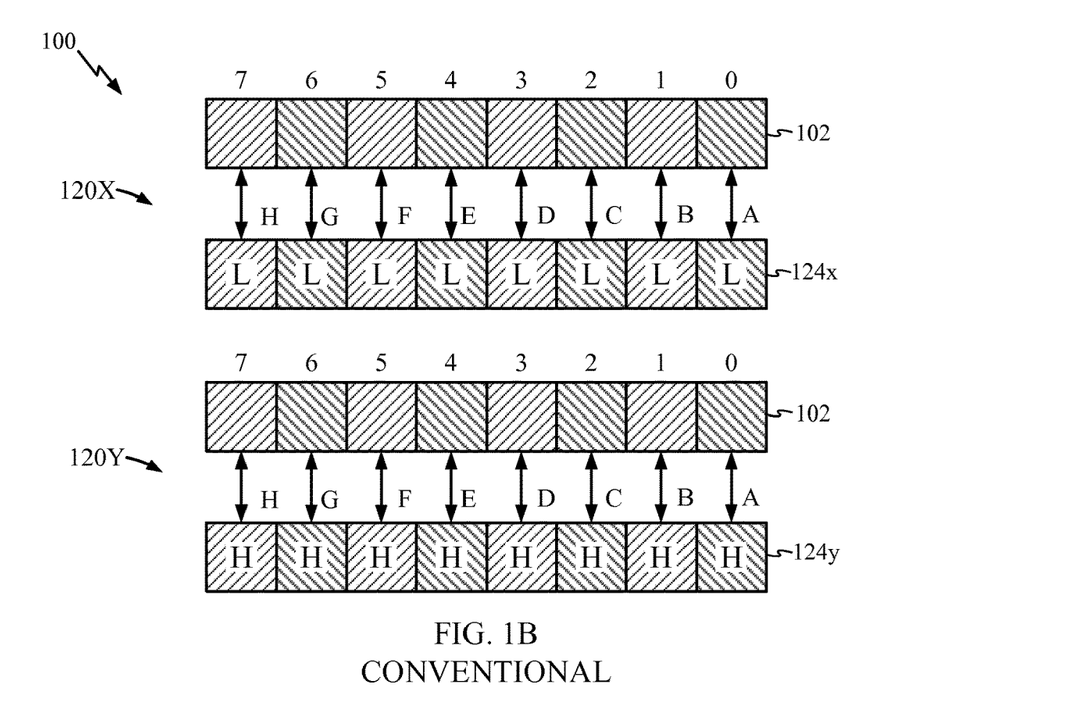
Figure 1C:
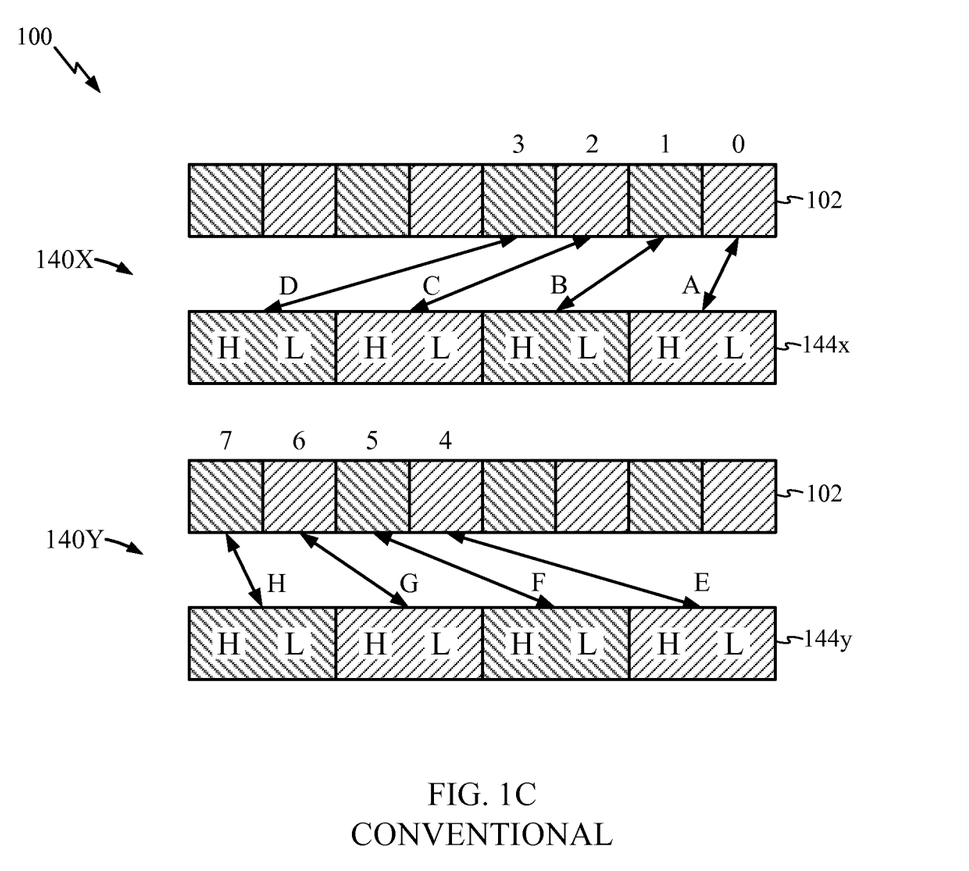

FIGS. 1A-C illustrate examples of challenges involved in conventional implementations for executing SIMD instructions with mixed-width operands. With reference to FIG. 1A, a first conventional implementation for executing SIMD instruction 100 is illustrated. It is assumed that SIMD instruction 100 may be executed by a conventional processor (not shown) which supports a 64-bit instruction set architecture (ISA). This means that instructions such as SIMD instruction 100 may specify operands with bit-widths up to 64-bits. The 64-bit operands may be specified in terms of 64-bit registers or a pair of 32-bit registers.

The object of SIMD instruction 100 is to execute the same instruction on each data element of source operand 102. Source operand 102 is a 64-bit vector comprising eight 8-bit data elements labeled 0-7. Source operand 102 may be stored in a single 64-bit register or a pair of 32-bit registers. The same instruction or common operation to be executed on each of the eight data elements 0-7 may be, for example, multiplication, square function, left-shift function, increment function, addition (e.g., with a constant value or immediate fields in the instruction or with values provided by another vector operand), etc., the result of which may consume more than 8-bits, and up to 16-bits of storage for each of the eight resulting data elements. This means that the result of SIMD instruction 100 may consume twice the storage space that source operand 102 may consume, i.e., two 64-bit registers or two pairs of 32-bit registers.

Since the conventional processor configured to implement SIMD instruction 100 does not include instructions which specify operands of bit-widths greater than 64-bits, SIMD instruction 100 may be divided into two component SIMD instructions 100X and 100Y. SIMD instruction 100X specifies the common operation to be performed on data elements labeled with even-numbers (or "even-numbered data elements") 0, 2, 4, and 6 of source operand 102. SIMD instruction 100X specifies destination operand 104$x$ which is 64-bits wide and includes 16-bit data elements labeled A, C, E, and G, each of which i composed of high (H) 8-bits and low (L) 8-bits. The results of the common operation on even-numbered 8-bit data elements 0, 2, 4, and 6 of source operand 102 are correspondingly written to 16-bit data elements A, C, E, and G of destination operand 104$x$. SIMD instruction 100Y is similar to SIMD instruction 100X with the difference that SIMD instruction 100Y specifies the common operation on data elements labeled with odd-numbers (or "odd-numbered data elements") 1, 3, 5, and 7 of source operand 102 with the results to be written to 16-bit data elements B, D, F, H of destination operand 104$y$ which is also a 64-bit operand similar to destination operand 104$x$ of SIMD instruction 100X. In this manner, each of the SIMD instructions 100X and 100Y can specify one 64-bit destination operand, and together, SIMD instructions 100X and 100Y can accomplish the execution of the common operation on each of the data elements 0-7 of source operand 102. However, due to the two separate instructions needed to implement SIMD instruction 100 increases code space.

FIG. 1B illustrates a second conventional implementation of SIMD instruction 100 using a different set of component SIMD instructions 120X and 120Y. SIMD instructions 120X and 120Y each specify the common operation on each of the 8-bit data elements 0-7 of source operand 102. SIMD instruction 120X specifies destination operand 124$x$ into which the low (L) 8-bits of the results are to be written, to corresponding 8-bit result data elements A-H of destination operand 124$x$ (while the high (H) 8-bits of the results are discarded). Similarly, instruction 120Y specifies destination operand 124$y$ into which the high (H) 8-bits of the results are to be written, to corresponding 8-bit data elements A-H of destination operand 124$y$ (while the low (L) 8-bits of the results are discarded). This second conventional implementation of SIMD instruction 100 also suffers from increased code space for the two component SIMD instructions 120X and 120Y. Moreover, as can be appreciated, the second conventional implementation also incurs wastage of power in calculating and discarding either the high (H) 8-bits (e.g., in executing instruction 120X) or the low (L) 8-bits (e.g., in executing instruction 120Y) for each of the data elements 0-7 of source operand 102.

FIG. 1C illustrates a third conventional implementation of SIMD instruction 100 using yet another set of component SIMD instructions 140X and 140Y, which are similar in some ways to SIMD instructions 100X and 100Y of FIG. 1A. The difference lies in which ones of the data elements of source operand 102 are operated on by each SIMD instruction. In more detail, rather than even-numbered 8-bit data elements, SIMD instruction 140X specifies the common operation to be performed on the lower four data elements 0-3 of source operand 102. The results are written to 16-bit data elements A, B, C, D of destination operand 144$x$. However, execution of SIMD instruction 140X involves the spreading out of the results of the operation on the lower four 8-bit data elements (spanning 32 bits) across all 64-bits of destination operand 140X. SIMD instruction 144y is similar and specifies the spreading out of the results of operation on the upper four 8-bit data elements 4-7 of source operand 102 across 16-bit data elements E, F, G, H of 64-bit destination operand 144y. Apart from increased code size as in the first and second conventional implementations, these spreading out data movements as seen in the third conventional implementation may need additional hardware such as a crossbar.

Accordingly, there is a need for improved implementations of mixed-width SIMD instructions which avoid the aforementioned drawbacks of the conventional implementations.

SUMMARY

Exemplary aspects include systems and methods related to a mixed-width single instruction multiple data (SIMD) instruction which has at least a source vector operand comprising data elements of a first bit-width and a destination vector operand comprising data elements of a second bit-width, wherein the second bit-width is either half of or twice the first bit-width. Correspondingly, one of the source or destination vector operands is expressed as a pair of registers, a first register and a second register. The other vector operand is expressed as a single register. Data elements of the first register correspond to even-numbered data elements of the other vector operand expressed as a single register, and data elements of the second register correspond to data elements of the other vector operand expressed as a single register.

For example, an exemplary aspect relates to a method of performing a mixed-width single instruction multiple data (SIMD) operation, the method comprising: receiving, by a processor, a SIMD instruction comprising at least a first source vector operand comprising a first set of source data elements of a first bit-width, and at least a destination vector operand comprising destination data elements of a second bit-width, wherein the second bit-width is twice the first bit-width. The destination vector operand comprises a pair of registers including a first register comprising a first subset of the destination data elements and a second register comprising a second subset of the destination data elements. Based on a sequential order of the first set of source data elements, the method includes executing the SIMD instruction in the processor, comprising generating the first subset of destination data elements in the first register from even-numbered source data elements of the first set, and generating the second subset of destination data elements in the second register from odd-numbered source data elements of the first set.

Another exemplary aspect relates to a method of performing a mixed-width single instruction multiple data (SIMD) operation, the method comprising receiving, by a processor, a SIMD instruction comprising at least a source vector operand comprising source data elements of a first bit-width, and at least a destination vector operand comprising destination data elements of a second bit-width, wherein the second bit-width is half of the first bit-width. The source vector operand comprises a pair of registers including a first register comprising a first subset of the source data elements and a second register comprising a second subset of the source data elements. Based on a sequential order of the destination data elements, the method includes executing the SIMD instruction in the processor, comprising generating even-numbered destination data elements from corresponding first subset of source data elements in the first register, and generating odd-numbered destination data elements from corresponding second subset of source data elements in the second register.

Another exemplary aspect relates to a non-transitory computer-readable storage medium comprising instructions executable by a processor, which when executed by the processor cause the processor to perform mixed-width single instruction multiple data (SIMD) operation. The non-transitory computer-readable storage medium, comprises a SIMD instruction, which comprises at least a first source vector operand comprising a first set of source data elements of a first bit-width, and at least a destination vector operand comprising destination data elements of a second bit-width, wherein the second bit-width is twice the first bit-width. The destination vector operand comprises a pair of registers including a first register comprising a first subset of the destination data elements and a second register comprising a second subset of the destination data elements. Based on a sequential order of the first set of source data elements, the non-transitory computer-readable storage medium includes code for generating the first subset of destination data elements in the first register from even-numbered source data elements of the first set, and code for generating the second subset of destination data elements in the second register from odd-numbered source data elements of the first set.

Yet another exemplary aspect relates to a non-transitory computer-readable storage medium comprising instructions executable by a processor, which when executed by the processor cause the processor to perform mixed-width single instruction multiple data (SIMD) operation, the non-transitory computer-readable storage medium comprising a SIMD instruction. The SIMD instruction comprises at least a source vector operand comprising source data elements of a first bit-width, and at least a destination vector operand comprising destination data elements of a second bit-width, wherein the second bit-width is half of the first bit-width. The source vector operand comprises a pair of registers including a first register comprising a first subset of the source data elements and a second register comprising a second subset of the source data elements. Based on a sequential order of the destination data elements, the non-transitory computer-readable storage medium includes code for generating even-numbered destination data elements from corresponding first subset of source data elements in the first register, and code for generating odd-numbered destination data elements from corresponding second subset of source data elements in the second register.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure relate to implementation of mixed-width SIMD operations which avoid data movement across SIMD lanes and reduce code size. For example, rather than decompose a SIMD operation into two or more component SIMD instructions (e.g., conventional execution of SIMD instruction 100 in FIGS. 1A-C), exemplary aspects include a single SIMD instruction which specifies one or more vector operands as a pair of operands, which may be expressed in terms of a pair of registers. By specifying at least one vector operand (either a source or a destination operand) as a pair of registers or a register pair, the single exemplary SIMD instruction can be used in place of two or more component conventional SIMD instructions. Therefore, code size is reduced for mixed-width SIMD operations.

It is noted that in this disclosure, reference is made to expressing operands in terms of registers, in order to follow the customary instruction formats where an instruction specifies an operation to be performed on one or more registers. Thus, a SIMD instruction may be of a format where a common operation is specified for one or more operands which are expressed in terms of registers. Thus, an exemplary mixed-width SIMD instruction according to this disclosure includes at least one vector operand expressed in terms of a single register and at least one other vector operand expressed in terms of a pair of registers. These references to registers may pertain to logical or architectural registers used by a program comprising exemplary SIMD instructions. They may also pertain to physical registers of a physical register file, without restriction. In general, the references to registers are meant to convey storage elements of a certain size.

Accordingly, an exemplary method of executing a mixed-width single instruction multiple data (SIMD) operation in a processor coupled to a register file may involve specifying a SIMD instruction with at least a first vector operand comprising data elements of a first bit-width and at least a second vector operand data elements of a second bit-width. The first vector operand can be a source vector operand and the second vector operand can be a destination vector operand. Correspondingly, the data elements of the source vector operand may be referred to as source data elements and data elements of the destination vector operand may be referred to as destination data elements.

A one-to-one correspondence exists between the source data elements and the destination data elements in an exemplary mixed-width SIMD instruction. In general, when the operation specified in the mixed-width SIMD instruction is performed on a source data element, a specific corresponding destination data element is generated. For example, consider a mixed-width SIMD operation for left-shifting the source vector operand to form a destination vector operand. In this example, each source data element generates a specific destination data element when a left-shift of the source data element is performed.

In one exemplary aspect of this disclosure, the second bit-width of the destination data elements can be less than, and specifically, half the size of the first bit-width of the source data elements. In this aspect, the destination vector operand can be expressed as a pair of registers and the source vector operand can be expressed as a single register.

In another exemplary aspect of this disclosure, the second bit-width of the destination data elements can be greater than, and specifically, twice the size of the first bit-width of the source data elements. In this aspect, the source vector operand can be expressed as a single register and the destination vector operand can be expressed as a pair of registers.

In order to illustrate the specific mapping between source and vector data elements of the source and destination vector operands, respectively, a sequential order is assigned to the data elements of the vector operand whose data elements have a smaller bit width. For example, a sequential order is assigned to data elements of the vector operand which is expressed as a single register. Based on the sequential order, even-numbered data elements (e.g., corresponding to numbers 0, 2, 4, 6, etc.) and odd-numbered data elements (e.g., corresponding to numbers 1, 3, 5, 7, etc.) are identified for the vector operand expressed as a single register. The pair of registers of the other vector operand are referred to as a first register and a second register, which comprise a first subset and a second subset of data elements respectively. Accordingly, the even-numbered data elements of the vector operand expressed as a single register are then assigned a correspondence with data elements of the first subset or first register, and the odd-numbered data elements are assigned a correspondence with data elements of the second subset or second register. In this manner, large data movements across SIMD lanes are avoided for source data elements during execution of the specified SIMD operation to generate corresponding destination data elements.

Exemplary aspects may also relate to SIMD operations which specify more than two vector operands, such as, include a third operand of a third bit-width, and beyond. One example is disclosed where two source vector operands, each expressed as a single register are specified for a mixed-width SIMD instruction to generate a destination vector operand expressed as a pair of register. Numerous other such instruction formats are possible within the scope of this disclosure. For the sake of simplicity, exemplary aspects for implementing mixed-width SIMD operations will be discussed with relation to some example SIMD instructions and bit-widths of operands, while keeping in mind that these are merely for the sake of explanation. As such, the features discussed herein can be extended to any number of operands and bit-widths of data elements for mixed-width vector operations.

Figure 2A:
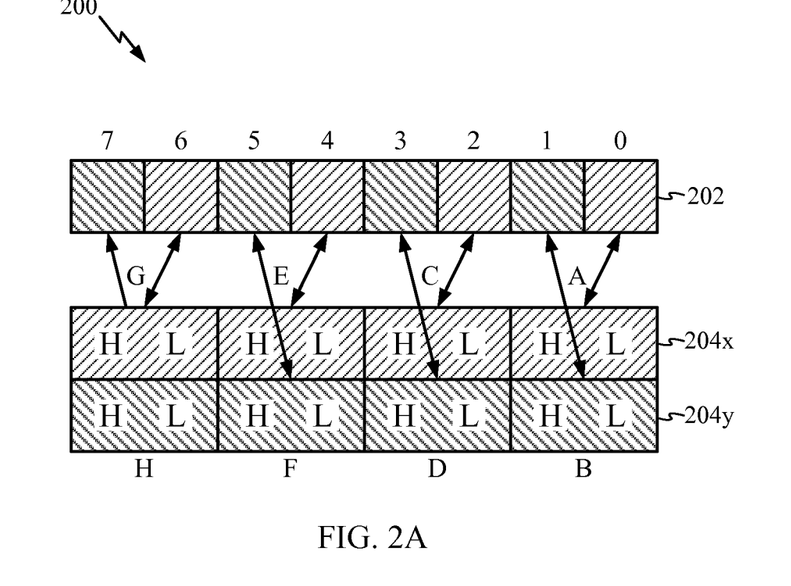
FIGS. 2A-C illustrate exemplary implementations of mixed-width SIMD instructions according to aspects of this disclosure.
Figure 2B:
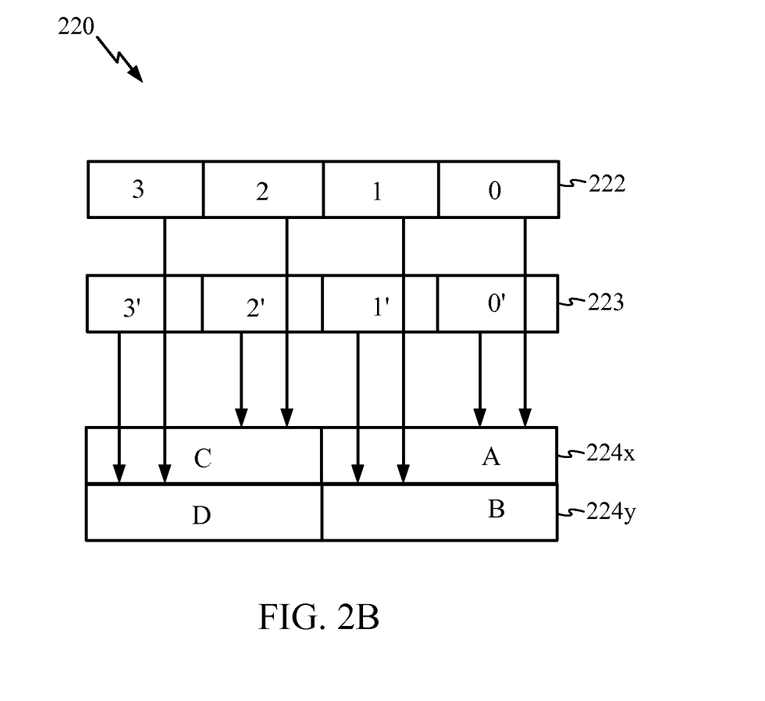
Figure 2C:
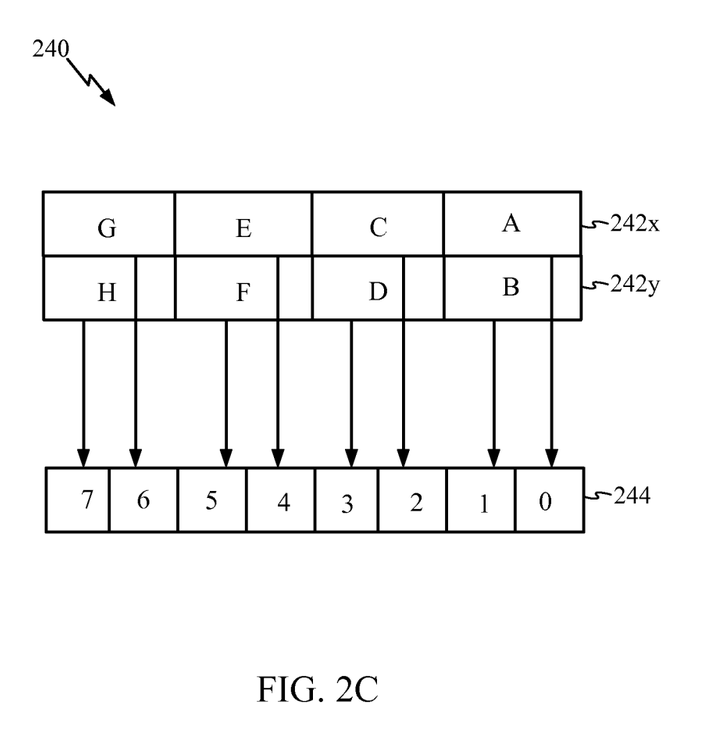

In FIGS. 2A-C, exemplary aspects pertaining to SIMD instructions 200, 220, and 240 are shown. Each of these SIMD instructions 200, 220, and 240 can be executed by a processor (e.g., processor 402 shown in FIGS. 4-5) configured to execute SIMD instructions. More specifically, each of these SIMD instructions 200, 220, and 240 may specify one or more source vector operands and one or more destination vector operands, where the source and destination vector operands may be expressed in terms of registers (e.g., 64-bit registers). The source and destination vector operands of SIMD instructions 200, 220, and 240 include corresponding source and destination data elements, each of which fall under one or more SIMD lanes. The number of SIMD lanes in the execution of a SIMD instruction corresponds to the number of parallel operations which are performed in the execution of the SIMD instruction. A processor or execution logic configured to implement the example SIMD instructions 200, 220, and 240, can accordingly include hardware (e.g., an arithmetic and logic unit (ALU) comprising a number of left/right shifters, adders, multipliers, etc.,) required to implement the parallel operations specified by the SIMD instructions 200, 220, and 240.

Accordingly, with reference to FIG. 2A, a first exemplary aspect is illustrated for execution of SIMD instruction 200. In one example, the processor is assumed to be capable of supporting a 64-bit instruction set architecture (ISA). SIMD instruction 200 may specify the same operation or common instruction to be performed on source data elements of source vector operands expressed in terms of a single 64-bit register.

The same operation or common instruction specified in SIMD instruction 200 may be, for example, a square function, a left-shift function, an increment function, an addition by a constant value, etc., on eight 8-bit source data elements (which can be implemented with logic elements such as eight 8-bit left-shifters, eight 8-bit adders, etc.) which produces corresponding eight resulting destination data elements which can consume up to 16-bits of storage. As shown, SIMD instruction 200 may specify source vector operand 202 comprising eight 8-bit data elements. A numerical order may be assigned to these eight 8-bit data elements of source vector operand 202, which is shown by the reference numerals 0-7. The result of SIMD instruction 200 can be expressed using eight 16-bit destination data elements or 128-bits altogether, which cannot be stored in a single 64-bit register. Rather than decompose SIMD instruction 200 into two or more instructions to handle this problem (e.g., as in conventional implementations of SIMD instruction 100 shown in FIGS. 1A-C), a destination vector operand is specified as a pair of component vector operands. The pair of component destination vector operands can be expressed as a corresponding pair of registers 204x, 204y. Note that the pair of registers need not be stored in consecutive physical locations in a register file or even have consecutive logical register numbers. As such, SIMD instruction 200 specifies destination vector operand expressed in terms of a pair of component vector operands or registers 204x, 204y (e.g., a pair of 64-bit registers), and source vector operand 202, which is expressed as a single register 202.

Further, first component destination vector operand expressed as first register 204x of the pair includes a first subset of the results of SIMD instruction 200 performed on even-numbered source data elements 0, 2, 4, and 6 of source vector operand 202. These results are illustrated by destination data elements A, C, E, and G, which have a one-to-one correspondence to even-numbered source data elements 0, 2, 4, and 6, which means that large movements across SIMD lanes is avoided for the results in this exemplary arrangement of destination data elements A, C, E, and G. Similarly, second component destination vector operand expressed as a second register 204y of the pair includes a second subset of the results of SIMD instruction 200 performed on odd-numbered source data elements 1, 3, 5, and 7 of source vector operand 202. These results are illustrated by destination data elements B, D, F, and H, which have a one-to-one correspondence to odd-numbered source data elements 1, 3, 5, and 7, which means that once again, large movements across SIMD lanes is avoided for the results in this exemplary arrangement of destination data elements B, D, F, and H. Accordingly, in this case, even-numbered source data elements 0, 2, 4, and 6 of source vector operand 202 correspond to or generate destination data elements A, C, E, and G of first register 204x; and odd-numbered source data elements 1, 3, 5, and 7 of source vector operand 202 correspond to or generate destination data elements B, D, F, and H of second register 204y.

Considering eight 8-bit SIMD lanes, e.g., referred to as SIMD lanes 0-7, with each lane comprising a respective source data element 0-7, it is seen that the amount of movement involved to generate a corresponding destination data element A-H is contained within the same SIMD lane or an adjacent SIMD lane. In other words, a first set of source data elements (e.g., source data element 0-7) are in respective SIMD lanes, and from each one of the source data elements, a destination data element (e.g., a corresponding destination data element A-H) is generated in the respective SIMD lane or a SIMD lane adjacent to the respective SIMD lane. For example, even-numbered source data elements 0, 2, 4, and 6 in SIMD lanes 0, 2, 4, and 6, respectively, generate destination data elements A, C, E, and G, which are respectively contained within SIMD lanes 0-1, 2-3, 4-5, and 6-7. Similarly, odd-numbered source data elements 1, 3, 5, and 7 in SIMD lanes 0, 2, 4, and 6, respectively, generate destination data elements B, D, F, and H, which are respectively also contained within SIMD lanes 0-1, 2-3, 4-5, and 6-7.

Accordingly, in the first exemplary aspect of FIG. 2A, mixed-width SIMD instruction 200 involves efficient use of instruction space or code space (since only one SIMD instruction is used, rather than two or more component SIMD instructions), whose implementation or execution avoids large data movements across SIMD lanes.

With reference now to FIG. 2B, another exemplary aspect is illustrated with relation to mixed-width SIMD instruction 220. SIMD instruction 220 involves two source vector operands: first source vector operand expressed as a single register 222 and second source vector operand expressed as a single register 223, which have a first set and second set, respectively, of four 16-bit source data elements. SIMD instruction 220 may specify a same or common operation such as a multiplication (e.g., with rounding) on the two source vector operands, wherein four 16-bit source data elements of the first set (in register 222) are multiplied by corresponding four 16-bit source data elements of the second set (in register 223) to produce four 32-bit results (where implementation of SIMD instruction 220 can involve logic elements such as four 16×16 multipliers). Since 128-bits are needed to be able to store these four 32-bit results, a destination vector operand is specified in terms of a pair of component vector operands: first component destination vector operand and second component destination vector operand (these may be expressed as a first 64-bit register 224$x$ and a second 64-bit register 224$y$ correspondingly). It is noted that SIMD instruction 220 may also be applicable to addition of source data elements of the first set with corresponding source data elements of the second set, where the corresponding results may consume more than 16-bits (even if not all 32-bits) for each destination data element.

In FIG. 2B, source data elements of the first and second sets are assigned a sequential order, representatively shown as 0, 1, 2, 3 and 0', 1', 2', 3', respectively. First component destination vector operand in first register 224$x$ holds a first subset of the results of SIMD instruction 220 (shown as 32-bit destination data elements A and C) corresponding to even-numbered source data elements of the source operands 222 and 223; and similarly, second component destination vector operand in second register 224$y$ holds a second subset of the results of SIMD instruction 220 (shown as 32-bit data elements B and D) corresponding to odd-numbered source data elements of the source operands 222 and 223. In this case, it is seen that even-numbered source data elements (0, 0') and (2, 2') of first source vector operand 222 and second source vector operand 223, respectively, generate data elements A and C of first destination vector operand 224$x$; and odd-numbered data elements (1, 1') and (3, 3') of first source vector operand 222 and second source vector operand 223, respectively, generate data elements B and D of second destination vector operand 224$y$.

Once again, it is seen in the second exemplary aspect of FIG. 2B, mixed-width SIMD instruction 220 accomplishes code space efficiency by utilizing a single mixed-width SIMD instruction rather than two or more component SIMD instructions. Moreover, it is also seen that movements across SIMD lanes is minimized in this aspect as well. In general, the first set of source data elements and second set of source data elements are in respective SIMD lanes, and generate from each one of the source data elements of the first set and corresponding one of the source data elements of the second set, a destination data element in the respective SIMD lane or a SIMD lane adjacent to the respective SIMD lane. For example, considering four 16-bit SIMD lanes 0-3 which comprise the first set of source data elements 0-3 (or second set of source data elements 0'-3'), respectively, data movement for a source data element of the first and second to generate a corresponding destination data elements A-D is contained within the same SIMD lane and at most an adjacent SIMD lane (e.g., even-numbered source data elements (0, 0') and (2, 2') in SIMD lanes 0 and 2, respectively, generate destination data elements A and C in SIMD lanes 0-1 and 2-4; and similarly, odd-numbered source data elements (1, 1') and (3, 3') in SIMD lanes 1 and 3, respectively, generate destination data elements B and D in SIMD lanes 0-1 and 2-4).

FIG. 2C represents a third exemplary aspect related to mixed-width SIMD instruction 240. Unlike mixed-width SIMD instructions 200 and 220, a source vector operand of mixed-width SIMD instruction 240 is specified as a pair of component vector operands or expressed as a register pair. It is noted that mixed-width SIMD instruction 240 is different from mixed-width SIMD instruction 220 because mixed-width SIMD instruction 220 included two separate source vector operands, where data elements of one source vector operand were specified to interact (e.g., get multiplied with) data elements of another source vector operand. On the other hand, in mixed-width SIMD instruction 240, a pair of component source vector operands is specified because not doing so would have consumed two separate instructions. For example, SIMD instruction 240 may involve a common operation of a right-shift function from 16-bits to 8-bits to be performed on eight 16-bit source data elements in order to obtain a result of eight 8-bit destination data elements (where implementation of SIMD instruction 240 can involve logic elements such as eight 8-bit right-shifters). However, since eight 16-bit source data elements consume 128-bits, conventional implementations would have split up this operation to be performed using two component SIMD instructions. On the other hand, in the exemplary aspect of FIG. 2C, a source vector operand pair comprising first component source vector operand in first register 242$x$ and a second component source vector operand in second register 242$y$ are specified by SIMD instruction 240. Accordingly, code space is efficiently used.

The destination vector operand is expressed as a single 64-bit register 244 in this case and comprises eight 8-bit destination data elements which are results of SIMD instruction 240. Accordingly, a sequential order is assigned to the destination data elements of the destination vector operand in register 244, which are shown with reference numerals 0-7. The source data elements of the pair of component source vector operands (expressed as a pair of registers 242$x$, 242$y$) are arranged such that first register 242$x$ comprising a first subset of source data elements A, C, E, and G, will generate the results corresponding to even-numbered destination data elements 0, 2, 4, and 6 of the destination vector operand in register 244, respectively; and second register 242$y$ comprising a second subset of source data elements B, D, F, and H, will generate the results corresponding to odd-numbered destination data elements 1, 3, 5, and 7, respectively, of destination vector operand in register 244.

Thus code space can be effectively utilized and data movement across SIMD lanes can be minimized even in cases where the source vector operands are wider than the destination vector operands, by specifying a pair of component source vector operands or expressing the source vector operand as a pair of registers. Movement across SIMD lanes in execution of SIMD instruction 240 is also minimized. In general, it is seen that the destination data elements are in respective SIMD lanes, and each one of the destination data elements is generated from a source data element in the respective SIMD lane or a SIMD lane adjacent to the respective SIMD lane. For example, considering eight 8-bit SIMD lanes corresponding to the eight destination data elements 0-7, it is seen that source data elements A, C, E, and G, will move from SIMD lanes 0-1, 2-3, 4-5, and 6-7 respectively to generate the results corresponding to even-numbered destination data elements in SIMD lanes 0, 2, 4, and 6; and source data elements B, D, F, and H, will move from SIMD lanes 0-1, 2-3, 4-5, and 6-7 respectively to generate the results corresponding to even-numbered destination data elements in SIMD lanes 1, 3, 5, and 7. In either case, the movement is contained within two SIMD lanes.

Figure 3A:
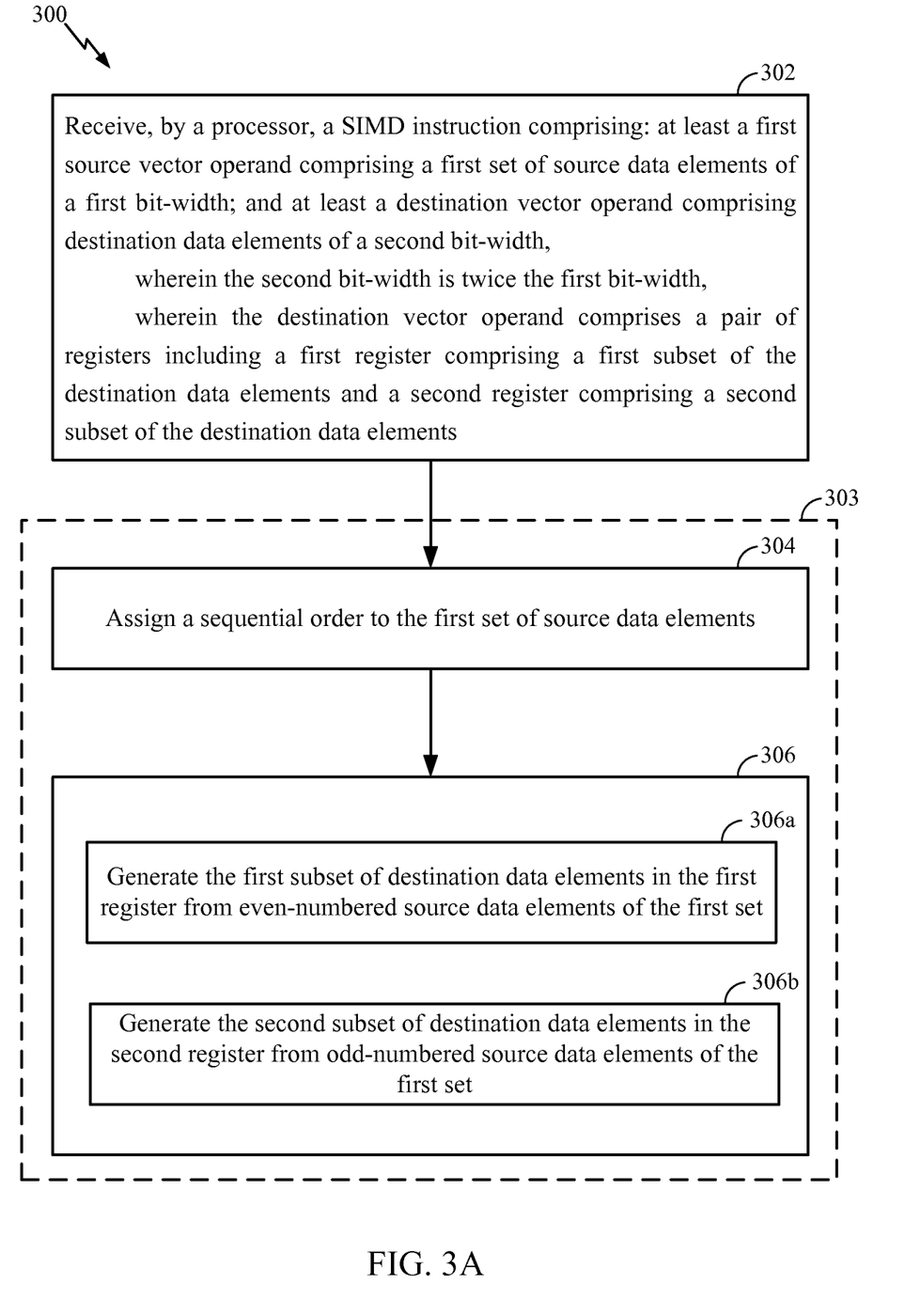
FIGS. 3A-B illustrate methods of performing mixed-width single instruction multiple data (SIMD) operations.

Accordingly, it will be appreciated that aspects include various methods for performing the processes, functions and/or algorithms disclosed herein. For example, as illustrated in FIG. 3A, an aspect can include a method 300 of performing a mixed-width single instruction multiple data (SIMD) operation, in accordance with FIGS. 2A-B, for example.

In Block 302, method 300 includes receiving, by a processor (e.g., processor 402 of FIG. 4, which will be explained below), and with reference, for example, to FIG. 2A, a SIMD instruction (e.g., SIMD instruction 200) comprising at least a first source vector operand (e.g., in register 202) comprising a first set of source data elements (e.g., source data elements 0-7) of a first bit-width (e.g., 8-bits); and at least a destination vector operand (e.g., in register pair 204x, 204y) comprising destination data elements (e.g., destination data elements A-H) of a second bit-width (e.g., 16-bits), wherein the second bit-width is twice the first bit-width, wherein the destination vector operand comprises a pair of registers including a first register (e.g., 204x) comprising a first subset of the destination data elements (e.g., destination data elements A, C, E, G) and a second register comprising a second subset of the destination data elements (e.g., destination data elements B, D, F, H).

In Block 303 (which is shown to include Blocks 304 and 306), method 300 further includes executing the mixed-width SIMD instruction in the processor. Specifically, considering a sequential order (e.g., 0-7) assigned to the source data elements in Block 304, Block 306 includes executing the SIMD instruction in the processor. In further detail, Block 306 is made of the components Blocks 306a and 306b which may be performed in parallel.

Block 306a includes generating the first subset of destination data elements (e.g., destination data elements A, C, E, G) in the first register (e.g., first register 204x) from even-numbered source data elements (e.g., source data elements 0, 2, 4, 6) of the first set.

Block 306b includes generating the second subset of destination data elements (e.g., destination data elements B, D, F, H) in the second register (e.g., second register 204y) from odd-numbered source data elements (e.g., source data elements 1, 3, 5, 7) of the first set.

In general, the SIMD instruction of method 300 can be one of a square function, left-shift function, increment, or addition by a constant value, of the source data elements of the first set. Code space efficiency is achieved by utilizing a single SIMD instruction in method 300. Movement across SIMD lanes is also minimized in method 300, where the first set of source data elements are in respective SIMD lanes, and method 300 includes generating from each one of the source data elements (e.g., source data element 0 in SIMD lane 0), a destination data element (e.g., destination data element A) in the respective SIMD lane (e.g., SIMD lane 0) or a SIMD lane adjacent (e.g., SIMD lane 1) to the respective SIMD lane.

It will also be noted that although not shown separately, method 300 can also include a method for implementing SIMD instruction 220 of FIG. 2B, which further comprises, for example, receiving in Block 302, a second source vector operand, comprising a second set of source data elements of the first bit-width (e.g., first and second source vector operands in registers 222 and 223), and the sequential order of the first set of source data elements corresponds to a sequential order of the second set of source data elements. In this case, based on the sequential order assigned in Block 304, Block 306 includes executing the SIMD instruction in the processor, comprising Block 306a for generating the first subset of destination data elements in the first register from even-numbered source data elements of the first set and even-numbered source data elements of the second set; and Block 306b for generating the second subset of destination data elements in the second register from odd-numbered source data elements of the first set and even-numbered source data elements of the second set. In this case, the SIMD instruction can be a multiplication or addition of the source data elements of the first set with corresponding source data elements of the second set, wherein the first set of source data elements and second set of source data elements are in respective SIMD lanes, and generating from each one of the source data elements of the first set and corresponding one of the source data elements of the second set, a destination data element in the respective SIMD lane or a SIMD lane adjacent to the respective SIMD lane.

Figure 3B:
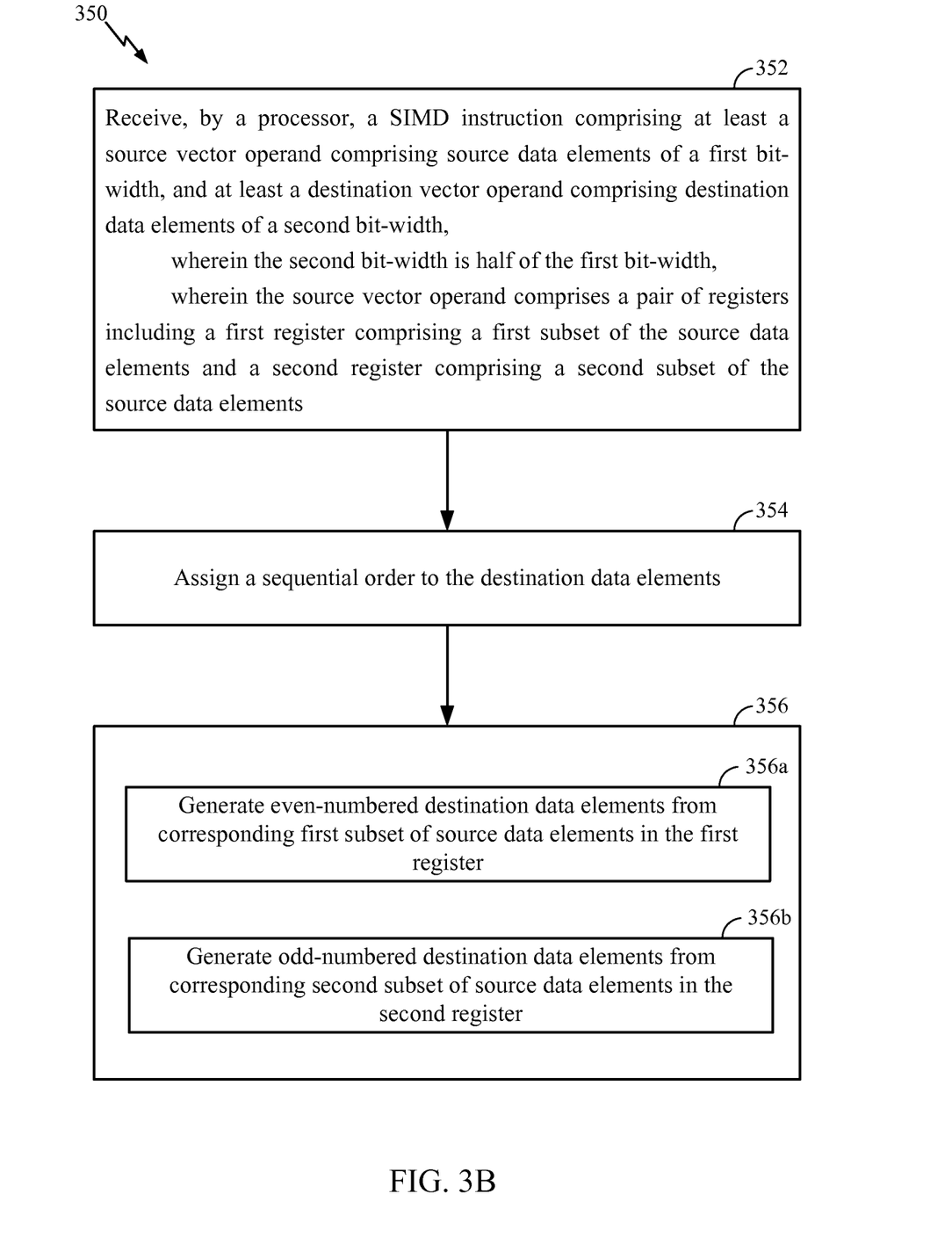

With reference to FIG. 3B, another method for performing the processes, functions and/or algorithms disclosed herein is illustrated. For example, as illustrated in FIG. 3B, method 300 includes another method of performing a mixed-width single instruction multiple data (SIMD) operation, in accordance with FIG. 2C, for example.

In Block 352, method 350 includes receiving, by a processor (e.g., processor 402), a SIMD instruction (e.g., SIMD instruction 240) comprising: at least a source vector operand (e.g., in registers 242x, 242y) comprising source data elements (e.g., source data elements A-H) of a first bit-width (e.g., 16-bits); and at least a destination vector operand (e.g., in register 244) comprising destination data elements (e.g., destination data elements 0-7) of a second bit-width (e.g., 8-bits), wherein the second bit-width is half of the first bit-width, wherein the source vector operand comprises a pair of registers including a first register (e.g., first register 242x) comprising a first subset of the source data elements (e.g., destination data elements 0, 2, 4, 6) and a second register (e.g., second register 242y) comprising a second subset of the source data elements (e.g., destination data elements 1, 3, 5, 7).

In Block 354, a sequential order is assigned to the destination data elements, and in Block 356, the SIMD instruction is executed. Block 356 includes sub blocks 356a and 356b, which can also be performed in parallel.

Block 356a includes generating even-numbered destination data elements (e.g., destination data elements 0, 2, 4, 6) from corresponding first subset of source data elements in the first register (e.g., source data elements A, C, E, G).

Block 356b includes generating odd-numbered destination data elements (e.g., destination data elements 1, 3, 5, 7) from corresponding second subset of source data elements in the second register (e.g., source data elements B, D, F, H).

In exemplary aspects, the SIMD instruction of method 350 may be a right-shift function of the source data elements, wherein the destination data elements are in respective SIMD lanes (e.g., SIMD lanes 0-7), and generating each one of the destination data elements (e.g., destination data element 0) from a source data element (e.g., source data element A) in the respective SIMD lane (e.g., SIMD lane 0) or a SIMD lane adjacent (e.g., SIMD lane 1) to the respective SIMD lane.

Figure 4:
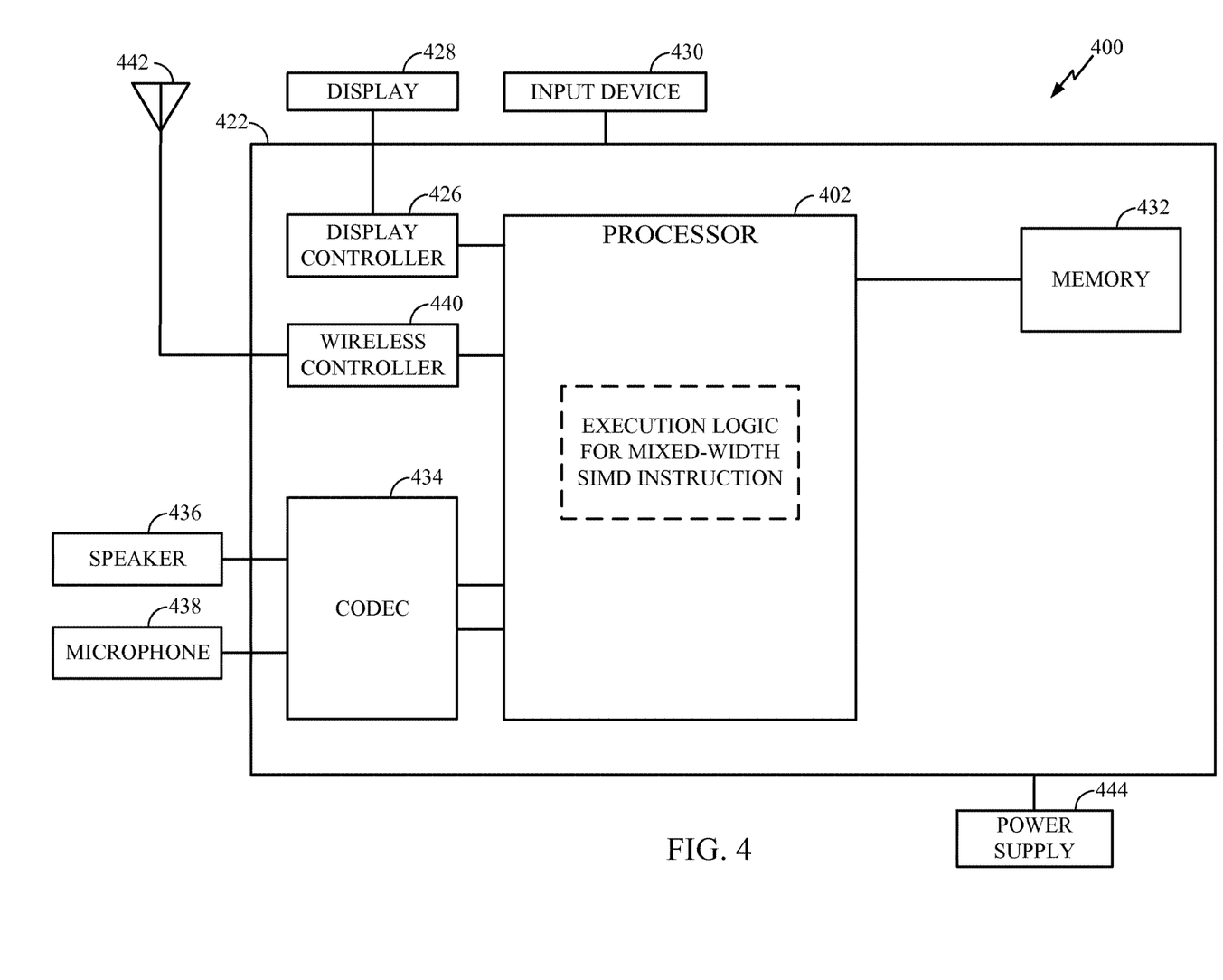
FIG. 4 illustrates an exemplary wireless device 400 in which an aspect of the disclosure may be advantageously employed.

Referring to FIG. 4, a block diagram of a particular illustrative aspect of wireless device 400 according to exemplary aspects. Wireless device 400 includes processor 402 which may be configured (e.g., include execution logic) to support and implement the execution of exemplary mixed-width SIMD instructions, for example, according to methods 300 and 350 of FIG. 3A and FIG. 3B, respectively. As shown in FIG. 4, processor 402 may be in communication with memory 432. Processor 402 may include a register file (not shown) which holds physical registers corresponding to the registers (e.g., logical registers) in terms of which operands of the exemplary SIMD instructions are expressed. The register file may be supplied with data from memory 432 in some aspects. Although not shown, one or more caches or other memory structures may also be included in wireless device 400.

FIG. 4 also shows display controller 426 that is coupled to processor 402 and to display 428. Coder/decoder (CODEC) 434 (e.g., an audio and/or voice CODEC) can be coupled to processor 402. Other components, such as wireless controller 440 (which may include a modem) are also illustrated. Speaker 436 and microphone 438 can be coupled to CODEC 434. FIG. 4 also indicates that wireless controller 440 can be coupled to wireless antenna 442. In a particular aspect, processor 402, display controller 426, memory 432, CODEC 434, and wireless controller 440 are included in a system-in-package or system-on-chip device 422.

In a particular aspect, input device 430 and power supply 444 are coupled to the system-on-chip device 422. Moreover, in a particular aspect, as illustrated in FIG. 4, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 depicts a wireless communications device, processor 402 and memory 432 may also be integrated into a set top box, a music player, a video player, an entertainment unit, a navigation device, a personal digital assistant (PDA), a fixed location data unit, a communications device, or a computer. Further, at least one or more exemplary aspects of wireless device 400 may be integrated in at least one semiconductor die.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include computer readable media (e.g., a non-transitory computer readable storage medium) embodying a method for implementing mixed-width SIMD instructions (e.g., according to methods 300 and 350 described above, for implementing SIMD instructions of FIGS. 2A-C). Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of performing a mixed-width single instruction multiple data (SIMD) operation, the method comprising:
    receiving, by a processor, a SIMD instruction comprising:
        a first source vector operand comprising a first source register, the first source register comprising a first set of source data elements of a first bit-width; and
        a destination vector operand comprising destination data elements of a second bit-width, wherein the second bit-width is twice the first bit-width,
        wherein the destination vector operand comprises a pair of destination registers including a first destination register comprising a first subset of the destination data elements and a second destination register comprising a second subset of the destination data elements,
        wherein the source register is a single register corresponding to the pair of destination registers; and
    based on a sequential order of the first set of source data elements, executing the SIMD instruction in the processor, comprising:
        generating the first subset of the destination data elements in the first destination register from even-numbered source data elements of the first set; and
        generating the second subset of the destination data elements in the second destination register from odd-numbered source data elements of the first set.

2. The method of claim 1, wherein the first set of source data elements are in respective SIMD lanes, and generating from each one of the source data elements, a respective destination data element in the respective SIMD lane or a SIMD lane adjacent to the respective SIMD lane.

3. The method of claim 1, wherein the SIMD instruction is one of a square function, left-shift function, increment, or addition by a constant value of the source data elements of the first set.

4. A method of performing a mixed-width single instruction multiple data (SIMD) operation, the method comprising:
receiving, by a processor, a SIMD instruction comprising:
a source vector operand comprising source data elements of a first bit-width; and
a destination vector operand comprising a destination register, the destination register comprising destination data elements of a second bit-width, wherein the second bit-width is half of the first bit-width,
wherein the source vector operand comprises a pair of source registers including a first source register comprising a first subset of the source data elements and a second source register comprising a second subset of the source data elements, and wherein the destination register is a single register corresponding to the pair of source registers; and
based on a sequential order of the destination data elements, executing the SIMD instruction in the processor, comprising:
generating even-numbered destination data elements from the first subset of the source data elements; and
generating odd-numbered destination data elements from the second subset of the source data elements.

5. The method of claim 4, wherein the SIMD instruction is a right-shift function of the source data elements.

6. The method of claim 4, wherein the destination data elements are in respective SIMD lanes, and generating each one of the destination data elements from a source data element in the respective SIMD lane or a SIMD lane adjacent to the respective SIMD lane.

7. A non-transitory computer-readable storage medium comprising instructions executable by a processor, which when executed by the processor cause the processor to perform mixed-width single instruction multiple data (SIMD) operation, the non-transitory computer-readable storage medium, comprising:
a SIMD instruction comprising:
a first source vector operand comprising a first set of source data elements of a first bit-width; and
a destination vector operand comprising destination data elements of a second bit-width, wherein the second bit-width is twice the first bit-width,
wherein the destination vector operand comprises a pair of destination registers including a first destination register comprising a first subset of the destination data elements and a second destination register comprising a second subset of the destination data elements,
wherein the source register is a single register corresponding to the pair of destination registers; and
based on a sequential order of the first set of source data elements:
code for generating the first subset of the destination data elements in the first register from even-numbered source data elements of the first set; and
code for generating the second subset of the destination data elements in the second register from odd-numbered source data elements of the first set.

8. The non-transitory computer-readable storage medium of claim 7, wherein the first set of source data elements are in respective SIMD lanes, and comprising code for generating from each one of the source data elements, a respective destination data element in the respective SIMD lane or a SIMD lane adjacent to the respective SIMD lane.

9. The non-transitory computer-readable storage medium of claim 7, wherein the SIMD instruction is one of a square function, left-shift function, increment, or addition by a constant value of the source data elements of the first set.

10. A non-transitory computer-readable storage medium comprising instructions executable by a processor, which when executed by the processor cause the processor to perform mixed-width single instruction multiple data (SIMD) operation, the non-transitory computer-readable storage medium comprising:
a SIMD instruction comprising:
a source vector operand comprising source data elements of a first bit-width; and
a destination vector operand comprising a destination register, the destination register comprising destination data elements of a second bit-width, wherein the second bit-width is half of the first bit-width,
wherein the source vector operand comprises a pair of source registers including a first source register comprising a first subset of the source data elements and a second source register comprising a second subset of the source data elements, and wherein the destination register is a single register corresponding to the pair of source registers; and
based on a sequential order of the destination data elements:
code for generating even-numbered destination data elements from the first subset of the source data elements; and
code for generating odd-numbered destination data elements from the second subset of the source data elements.

11. The non-transitory computer-readable storage medium of claim 10, wherein the SIMD instruction is a right-shift function of the source data elements.

12. The non-transitory computer-readable storage medium of claim 10, wherein the destination data elements are in respective SIMD lanes, and comprising code for generating each one of the destination data elements from a source data element in the respective SIMD lane or a SIMD lane adjacent to the respective SIMD lane.

* * * * *